(12) United States Patent
Jonas et al.

(10) Patent No.: US 11,115,482 B1
(45) Date of Patent: Sep. 7, 2021

(54) SYSTEM AND METHOD FOR CORRELATING KEEP-ALIVE CONNECTION COMMUNICATIONS WITH UNARY CONNECTION COMMUNICATIONS

(71) Applicant: Xevo Inc., Bellevue, WA (US)

(72) Inventors: Michael Peace Jonas, Mercer Island, WA (US); Michael Shawn Garlick, Renton, WA (US)

(73) Assignee: XEVO INC., Bellevue, WA (US)

( * ) Notice: Subject to any disclaimer, the term of this patent is extended or adjusted under 35 U.S.C. 154(b) by 24 days.

(21) Appl. No.: 16/836,625

(22) Filed: Mar. 31, 2020

(51) Int. Cl.
*G06F 15/173* (2006.01)
*H04L 29/08* (2006.01)
*H04L 29/06* (2006.01)

(52) U.S. Cl.
CPC ............ *H04L 67/145* (2013.01); *H04L 67/16* (2013.01); *H04L 67/2809* (2013.01); *H04L 67/40* (2013.01)

(58) Field of Classification Search
CPC ... H04L 67/145; H04L 67/16; H04L 67/2809; H04L 67/40
See application file for complete search history.

(56) References Cited

U.S. PATENT DOCUMENTS

| | | | |
|---|---|---|---|
| 9,594,494 B2 * | 3/2017 | Beaven | G06Q 10/107 |
| 9,785,632 B1 * | 10/2017 | Beaven | H04W 4/023 |
| 9,818,369 B1 * | 11/2017 | Beaven | G09G 5/003 |
| 9,948,643 B2 * | 4/2018 | Yamamoto | H04L 63/102 |
| 10,015,445 B1 * | 7/2018 | Ludwig | H04N 7/183 |
| 10,097,548 B2 * | 10/2018 | Yamamoto | H04L 67/125 |
| 10,122,907 B1 * | 11/2018 | McKelvie | H04N 5/23296 |
| 10,176,380 B1 * | 1/2019 | Ludwig | G06K 9/00677 |
| 10,186,155 B2 * | 1/2019 | Tong | G07C 5/10 |
| 10,232,709 B2 * | 3/2019 | Snyder | H04L 67/10 |
| 10,298,885 B1 * | 5/2019 | Ludwig | H04N 5/23206 |
| 10,404,658 B1 * | 9/2019 | Ludwig | G06F 16/958 |
| 10,460,183 B2 * | 10/2019 | Welland | G06K 9/6256 |

(Continued)

OTHER PUBLICATIONS

TLS overhead, netsekure rng, http://netsekure.org/2010/03/tls-overhead/, Mar. 12, 2010, 3 pages, accessed Dec. 14, 2020.

*Primary Examiner* — Thanh T Nguyen
(74) *Attorney, Agent, or Firm* — Seed IP Law Group LLP

(57) ABSTRACT

Embodiments are directed towards a system and method of employing a bridge service to coordinate messages from a keep-alive connection between a head unit of a vehicle and a connection broker with microservices via unary connections. The bridge service stores configuration information that maps topic connection information for the keep-alive connection with microservice connection information. The bridge service subscribes with the connection broker to topics associated with the microservices based on the configuration information. A message that is published to the keep-alive connection having a published topic that corresponds to a subscribed topic is received from the connection broker. The microservice connection information that maps to the published topic is selected based on the configuration information. The bridge service establishes a unary connection with a microservice based on the selected microservice connection information, which is utilized to provide message payload information from the bridge service to the microservice.

16 Claims, 4 Drawing Sheets

(56) References Cited

U.S. PATENT DOCUMENTS

| | | | |
|---|---|---|---|
| 10,503,988 B2 * | 12/2019 | Cordell | G01C 21/3602 |
| 10,534,571 B2 * | 1/2020 | Anderson | G06F 3/1446 |
| 10,621,624 B2 * | 4/2020 | Beaven | G06Q 30/0275 |
| 10,834,221 B2 * | 11/2020 | Tong | G06K 9/00845 |
| 10,882,398 B2 * | 1/2021 | Cordell | B60K 37/06 |
| 10,949,886 B2 * | 3/2021 | Tong | G06Q 30/0266 |
| 10,989,552 B2 * | 4/2021 | Ludwig | H04N 21/812 |
| 10,999,557 B2 * | 5/2021 | Ludwig | H04N 5/23299 |
| 2012/0191860 A1 | 7/2012 | Traversat et al. | |
| 2014/0341039 A1 | 11/2014 | Rubin et al. | |
| 2014/0372516 A1 | 12/2014 | Watte et al. | |
| 2015/0079945 A1 | 3/2015 | Rubin et al. | |

* cited by examiner

SYSTEM AND METHOD FOR CORRELATING KEEP-ALIVE CONNECTION COMMUNICATIONS WITH UNARY CONNECTION COMMUNICATIONS

TECHNICAL FIELD

The present disclosure relates generally to communications between a head unit of a vehicle and a microservice.

BACKGROUND

Description of the Related Art

Automobiles are becoming more and more user friendly and interactive. Many new cars are now manufactured with a computer or digital user interface, called a head unit, which a user can use to control various aspects of the automobile and access a variety of content or applications. For example, the user can use the head unit to change radio stations, change the temperature of the automobile cabin, access maps and global positioning systems, access the internet, access other head-unit applications, or access or control other accessories of the automobile. The head unit can also provide various types of information or content to the user, such as when the automobile is due for an oil change or when a tire rotation should be performed, to name a few. Some newer head units can wirelessly transmit this information to remote servers, but the amount of data to be transmitted may be impacted by bandwidth constraints.

BRIEF SUMMARY

Briefly stated, embodiments are directed towards a system and method of employing a bridge service to coordinate messages from a keep-alive connection between a head unit of a vehicle and a connection broker with one or more microservices that utilize unary connections. Many microservices utilize restful communications such that a new connection is established and terminated each time data is provided to the microservice. Managing this type of on-demand connection can incur a lot of overhead bandwidth, especially with respect to an amount of data being provided to or received from the microservice.

The head unit described herein utilizes a connection broker and a topic connection mechanism to transmit data associated with different topics using a single keep-alive connection. The different topics are associated with different microservices. In particular, each topic may be associated with a different rest API endpoint. In various embodiments, a given microservice may have multiple rest endpoints, and thus be associated with multiple topics. The broker connection can be considered a publish and subscribe connection, namely it can be a subscription connection, a publish connection or another topic type of connection. Thus, it might be referred to herein as a subscribe connection or mechanism, a publish connection, or generically as a topic connection mechanism or as a publish/subscribe connection. The bridge service subscribes with the connection broker to a configurable set of topics, such that when a message is received by the connection broker and provided to the bridge service on those topics, the bridge service can make a network call to the appropriate endpoint. The bridge service is payload agnostic and utilizes configuration information that maps subscribed topics to a description of how to make a network call for each subscribed topic. In this way, the head unit can utilize different topics to provide information to different microservices on a single connection without modifying the microservices.

Briefly, the bridge service stores configuration information that maps topic connection information for the keep-alive connection with microservice connection information for the one or more microservices. The bridge service subscribes with the connection broker to one or more topics associated with a microservice endpoint via the keep-alive connection based on the configuration information, which may be referred to as subscribed topics. The connection broker receives messages that are published to the keep-alive connection from the head unit. These messages have a published topic that corresponds to a subscribed topic received from the connection broker. The microservice connection information that maps to the published topic for the message is selected based on the configuration information. The bridge service establishes a unary connection with a microservice of the one or more microservices based on the selected microservice connection information, which is utilized to provide message payload information from the bridge service to the microservice.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings.

DETAILED DESCRIPTION

Figure 1:
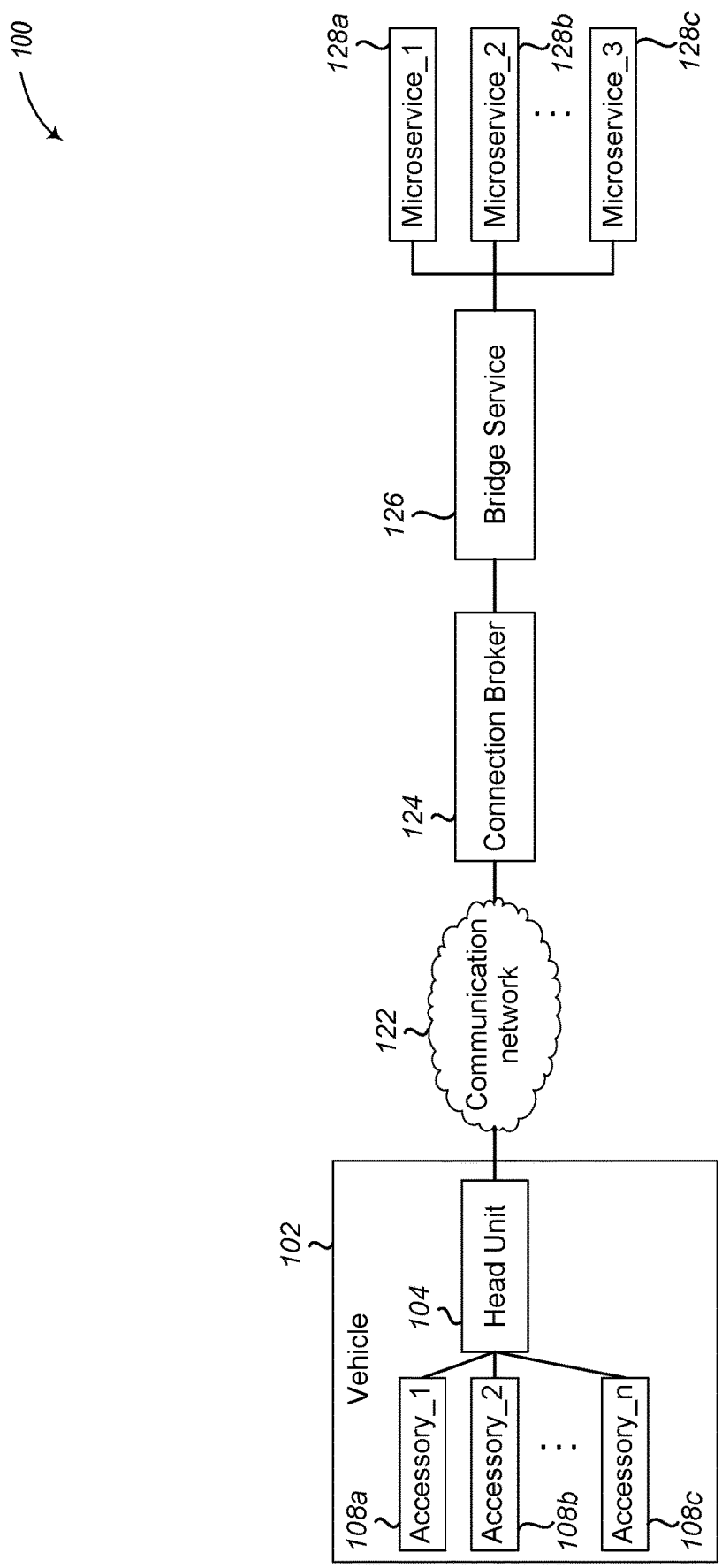
FIG. 1 illustrates a context diagram of a vehicle environment that communicates with microservices via a connection broker and bridge service in accordance with embodiments described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the automobile environment, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

The term "vehicle" is defined as a device used to transport people or goods (or both), and examples include automobiles, buses, aircraft, boats, or trains. Although most of the following text focuses on an automobile, the application of the concepts described herein is not limited to such a vehicle, and embodiments can be utilized in other devices with networking capabilities for which bandwidth usage is a leading concern. A "processor" is defined as a component with at least some circuitry or other hardware that can execute instructions. A "head unit" is defined as one or more components, whether part of a single unit or a collection of units, at least some of which include circuitry, configured to perform computations related to image processing or present content arising from the image processing (or both). A "reference system" is defined as a system of points, angles, locations, objects, or other markers used to determine a position of an object with respect to a vehicle, a user of the vehicle, or some component of or related to the vehicle.

FIG. 1 illustrates a context diagram of a vehicle environment that communicates with microservices via a connection broker and bridge service in accordance with embodiments described herein. System 100 includes a vehicle 102, a connection broker 124, a bridge service 126, and one or more microservices 128a-128c (collectively referred to as microservice 128).

The vehicle 102 has a head unit 104 and one or more accessories 108a-108c. The vehicle 102 is virtually any means of transportation that includes a computing device and an output interface to provide content to a user of the vehicle 102. In the illustrative examples described herein, the computing device of the vehicle is the head unit 104, although other types of computing devices may be employed. Moreover, examples of vehicles include automobiles, aerial vehicles, water vessels, railroad vehicles, and other modes of transportation.

The accessories 108a-108c can be any device or process that provides information or data directly or indirectly (such as via the head unit 104) to the user. Examples include the following: gas-level gauge, speedometer, odometer, oil-pressure gauge, temperature gauge, tire-pressure gauge, GPS device, ignition-status indicator, gear-shift mechanics or electronics indicating a gear state or change of state, seat-belt-status indicator, seat-weight sensors, clock, or other vehicle sensor that provides information to a user.

The head unit 104 is a computing device that provides content, interactive controls, user interfaces, or other information to users of the vehicle 102. As an illustrative example, the head unit 104 may provide a navigation interface, audio and radio controls, environmental controls, automobile performance or maintenance information, or other types of content. In various embodiments, the head unit 104 collects information from accessories 108a-108c. For example, the head unit 104 may collect oil pressure, current speed, tire pressure, weather conditions, user attention information, user driving information, or other information generated by vehicle sensors, vehicle input/output devices, or the head unit itself. The head unit 104 transmits at least some of the collected data or information to a microservice 128 via a connection broker 124.

The connection broker 124 is a messaging interface between the head unit 104 and the bridge service 126. The connection broker 124 utilizes and maintains a keep-alive connection with the head unit 104. In some embodiments, the connection broker 124 is an MQTT broker.

The head unit 104 establishes a keep-alive connection with the connection broker 124 via communication network 122. The communication network 122 includes various wireless networks that may be employed using various forms of communication technologies and topologies, such as cellular networks, mesh networks, or the like. In some embodiments, the communication network 122 may also include one or more wired networks in communication with one or more wireless networks to facilitate communications between the head unit 104 and the connection broker 124 using always open communication connections.

The head unit 104 transmits data to the connection broker 124 using one or more messages. The messages are transmitted with a particular topic or identifier indicating the type of information included in the messages or where the information was generated. For example, if the information is tire pressure, then the message includes a topic or identifier indicating that the data included in the message is from the tire pressure sensors. This type of transmission may be referred to as the head unit 104 publishing a message to the connection broker 124 for a given topic, also referred to as the published topic.

The connection broker 124 makes the received messages and data available to the bridge service 126 depending on whether the bridge service 126 has subscribed to receive data or messages having a particular topic, which may be referred to as the subscribed topic. For example, the bridge service 126 subscribes with the connection broker 124 to receive all messages associated with the subscribed topic of "user behavior." When the connection broker 124 receives a message from the head unit 104 and that message has a published topic of "user behavior," the connection broker 124 forwards the message, or the data from the payload of the message, to the bridge service 126 in accordance with the subscribed topic.

The bridge service 126 is a message translation interface between the connection broker 124 and the microservices 128a-128c, which is described in more detail below. Briefly, however, the bridge service 126 subscribes to particular subscribed topics with the connection broker 124. These subscribed topics corresponds to different microservices 128a-128c such that when a message is published with a given published topic that matches a given subscribed topic, the bridge service 126 establishes a connection with the microservice 128 that corresponds to that given subscribed topic and subsequently transmits the message, or its payload information or data, to that microservice 128. Likewise, the bridge service 126 can receive a response message from the microservice 128 and publish its payload to the connection broker 124 with a published topic. In this way, the head unit 104 can subscribe to that topic to receive the response message.

The microservices 128a-128c are processes or devices that perform actions on the data received from the vehicle 102. In some embodiments, the microservices 128a-128c may include backend services that support operation or functionality of the head unit 104. For example, the vehicle may include a camera (not illustrated) that is capturing images of an area outside of the vehicle 102. A first microservice 128a may utilize the captured images to determine if there are any parking spots near the vehicle 102 and a second microservice 128b may utilize the captured images to determine if the vehicle 102 is in danger of being in a collision with another vehicle. The first microservice 128a may respond with information identifying any available parking spots and the second microservice 128b may respond with information indicating that the vehicle 102 is in danger of being in a collision.

In other embodiments, the microservices 128 may include cloud-based or third party services that are accessible to the head unit 104 or the user of the vehicle 102. For example, the head unit 104 may include a software application that enables the user of the vehicle 102 to pre-order a pizza from a particular restaurant. A third microservice 128c may receive the pizza order from the head unit 104 and initiate a pizza ticket for the restaurant employees to begin making the pizza. The third microservice 128c may respond with an acknowledgement that the pizza order was received and is being processed.

In some situations, utilization of embodiments described herein can significantly reduce overhead bandwidth incurred of the head unit 104 when compared to conventional rest calls. For example, in some situations a rest call from the head unit to a microservice may incur 7910 bytes of overhead for each call. In a similar situation, embodiments described herein may result in the head unit incurring 696 bytes of overhead, which can result in an overhead bandwidth reduction of over 90%. These example situations are for illustrative purposes and are not to be limiting.

In various embodiments, the payload of the message from the head unit 104 or the response message from the microservice 128 is semantically equivalent for each topic. In at least one such embodiment, the head unit or the receiving microservice endpoint can successfully deserialize an object in the payload based on the topic name and the configuration utilized by the bridge service 126.

The connection broker 124 is any combination of computing devices, such as one or more servers or other cloud resources, which is remote to the vehicle 102 and can communicate with the head unit 104 via a keep-alive connection over communication network 122. Although the connection broker 124 is illustrated as a single device, embodiments are not so limited. Rather, the connection broker 124 may be one or more computer devices that perform one or more functions.

The microservices 128a-128c are any combination of computing devices, such as one or more servers or other cloud resources, which are remote to the vehicle 102 and can communicate with the bridge service 126 via a unary connection for a limited duration or particular message or sequence of messages or particular sequence of call and response messages. Although the microservices 128a-128c are illustrated as single devices, embodiments are not so limited. Rather, the microservices 128a-128c may each include one or more computer devices that perform one or more functions.

The bridge service 126 is any combination of computing devices, such as one or more servers or other cloud resources, which is remote to the vehicle 102 and can communicate with the connection broker 124 and the microservices 128a-128c. Although the bridge service 126 is illustrated as a single device, embodiments are not so limited. Rather, the bridge service 126 may be one or more computer devices that perform one or more functions.

Figure 2:
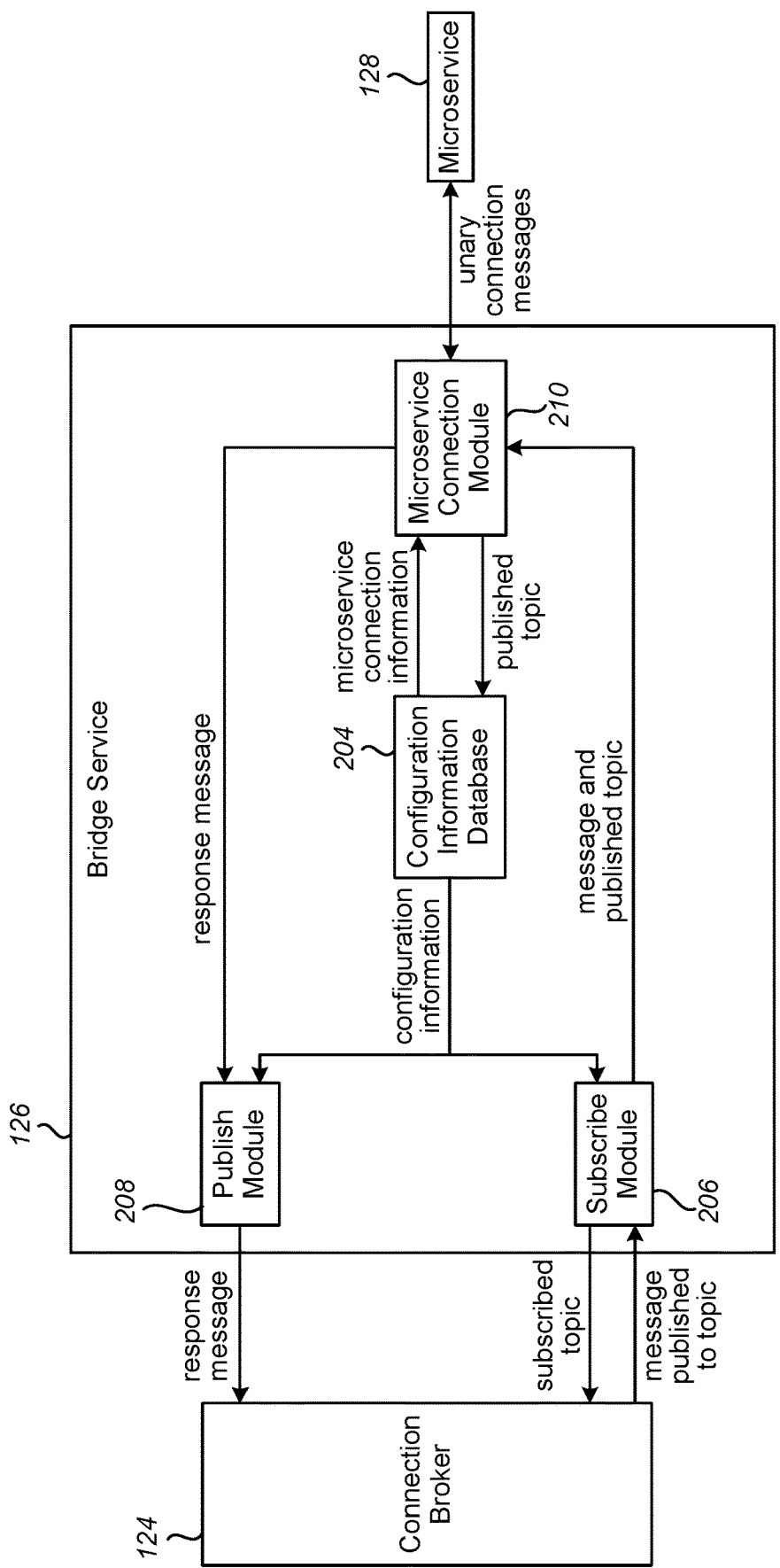
FIG. 2 illustrates a context diagram of a use case example for establishing communications between a connection broker, a bridge service, and a microservice in accordance with embodiments described herein.

FIG. 2 illustrates a context diagram of a use case example of a system 200 for establishing communications between a connection broker, a bridge service, and a microservice in accordance with embodiments described herein. System 200 includes a connection broker 124, a bridge service 126, and one or more microservices 128, similar to what is described in conjunction with FIG. 1.

As indicated herein, the connection broker 124 establishes a keep-alive connection with a head unit of a vehicle. The head unit can transmit messages to the connection broker 124 with a published topic.

The bridge service 126 includes a configuration information database 204, a subscribe module 206, a publish module 208, and a microservice connection module 210. Briefly, the configuration information database 204 maintains configuration information that maps topic connection information with microservice connection information. The subscribe module 206 informs the connection broker 124 of a specific subscribed topic and receives messages sent to the connection broker 124 from the head unit 104 having a published topic that matches the subscribe topic. The publish module 208 sends or publishes response messages to connection broker 124 for forwarding to the head unit 104. And the microservice connection module 210 establishes a connection with a microservice based on the published topic of the received message and its mapped microservice connection information.

Although the configuration information database 204 is illustrated as being included with the bridge service 126, embodiments are not so limited. In some embodiments, the configuration information database 204 is maintained by a separate computing device that is remote from the bridge service 126. The subscribe module 206, the publish module 208, and the microservice connection module 210 may be individual applications or processes being executed by one or more processors or they may be part of a single application or process being executed by one or more processors.

The configuration information database 204 stores configuration information that maps topic connection information with microservice connection information. In general, the configuration information defines a set of subscribe topics paired with details that enable the bridge service to initiate a network call to a microservice on behalf of the head unit based on the published topic of messages provided to the connection broker.

The topic connection information identifies one or more subscribed topics to provide to the connection broker, so that the connection broker can route messaging having a published topic that matches, either by a complete match or a match of a subtopic, a subscribed topic to the bridge service 126. In some embodiments, the topic information may also identify how response messages are published back to the connection broker, such as an acknowledgement that is sent back to the vehicle. The microservice connection information identifies details necessary to establish a connection with a microservice, such as network call information, SSL connection information to a third-party, etc.

The following are two format examples of particular configuration information mappings between topic connection information and microservice connection information:

Configuration information_1
    topic connection information
        Subtopic: /up/request-topic–1/+
        Pubtopic: /down/response-topic–1/+
    microservice connection information
        Type: REST
        httpMethod: POST
        URL: /kube-service-name/rest-path/
    Configuration information_2
    topic connection information
        Subtopic: /up/request-topic–2/+
        Pubtopic: /down/response-topic–2/+
    microservice connection information
        Type: gRPC
        URL: /kube-service-name
        service: grpc.service.name
        method: grpc.method.name These example configuration information are for illustrative purposes and are not to be limiting. For example, in some embodiments, Subtopic and Pubtopic could be inferred using url+service+method, or other conventions.

The subscribe module 206 obtains topic connection information from the configuration information database 204 and provides the subscribed topics to the connection broker 124. In various embodiments, the subscribe module 206 also establishes or provides connection information between the connection broker 124 and the bridge service 126. The subscribe module 206 also monitors the connection broker 124 for messages that are published to the subscribed topics. In some embodiments, the connection broker 124 forwards or otherwise routes such messages to the subscribe module 206 when received from the head unit of a vehicle. The subscribe module 206 provides the received message and its published topic to the microservice connection module 210.

The microservice connection module 210 queries the configuration information database 204 using the published topic of the message to obtain the corresponding microservice connection information that maps to the subscribed topic that matches the published topic. The microservice connection module 210 utilizes the obtained microservice connection information to establish a unary connection with the microservice 128. In some embodiments, the payload associated with the message may contain call specific information to be provided to the microservice 128. One example payload format of a received message may be as follows:

{
    "requestId":"WhateverTheCallerWantsInTheResponse", "urlSuffix":"/PathVariable/?RequestParam=value",
    "body":"arbitraryByte[ ]"
}

This example payload is for illustrative purposes and is not to be limiting. For example, in some embodiments, the envelope is encoded as a protobuf, which can further reduce bandwidth consumption.

Once the unary connection is established, the microservice connection module 210 provides the message or its payload, or a portion of the payload, to the microservice 128 via the unary connection. The unary connection is then terminated. Although, embodiments are described as receiving and transmitting a single message, embodiments are not so limited. In some embodiments, a plurality of messages may be associated with a single grouping of information, which may be transmitted to the microservice 128 via the unary connection before it is terminated. In some embodiments, one or more response messages may be received from the microservice 128 before the unary connection is terminated.

In various embodiments, the microservice 128 may provide response information back to the microservice connection module 210 via the unary connection. This response message may be an acknowledgement of receipt or information generated from processing the original message from the head unit. The microservice connection module 210 may provide the response information to the publish module 208. The publish module 208 may forward the response to the connection broker 124 using publish topic information in the corresponding configuration information. The head unit can subscribe to this same topic so that the connection broker 124 can route the response to the head unit. In some embodiments, the response message is an envelope or wrapper that includes the payload information received by the microservice connection module 210 from the microservice 128.

The following is an example use case scenario of the bridge service 126 coordinating message from the keep-alive connection between a head unit and the connection broker 124 and the unary connection with a microservice 128. The configuration information database 204 stores a configuration information mapping between a subscribed topic "outside_images" and a "parking_spot_management" microservice. This mapping also indicates that the "parking_spot_management" microservice is accessible at URL: /kube-parking-spot-management/rest-path-ABC/. The subscribe module 206 provides the subscribed topic to the connection broker 124. When the connection broker 124 receives images from the head unit over the keep-alive connection that have a published topic of "outside_images," same as the subscribed topic, the connection broker 124 forwards the received images to the subscribe module 206. The subscribe module 206 provides the message and the published topic to the microservice connection module 210. The microservice connection module 210, queries the configuration information database using the "outside_images" topic. The microservice connection module 210 receives in response the "parking_spot_management" microservice being accessible at URL: /kube-parking-spot-management/rest-path-ABC/information. The microservice connection module 210 then establishes a connection with the "parking_spot_management" microservice and provides the received images using the obtained URL. The microservice 128 can then utilize the images to determine if there are any parking spots near the vehicle 102. The results of the parking spot determination may be sent from the microservice 128 to the microservice connection module 210. The microservice connection module 210 may forward the results to the publish module 208 for publishing to the connection broker 124 for the head unit 104 to obtain.

The operation of certain aspects of the disclosure will now be described with respect to FIG. 3. In at least one of various embodiments, process 300 described in conjunction with FIG. 3 may be implemented by or executed on one or more computing devices, such as bridge service 126 or other cloud-based systems.

Figure 3:
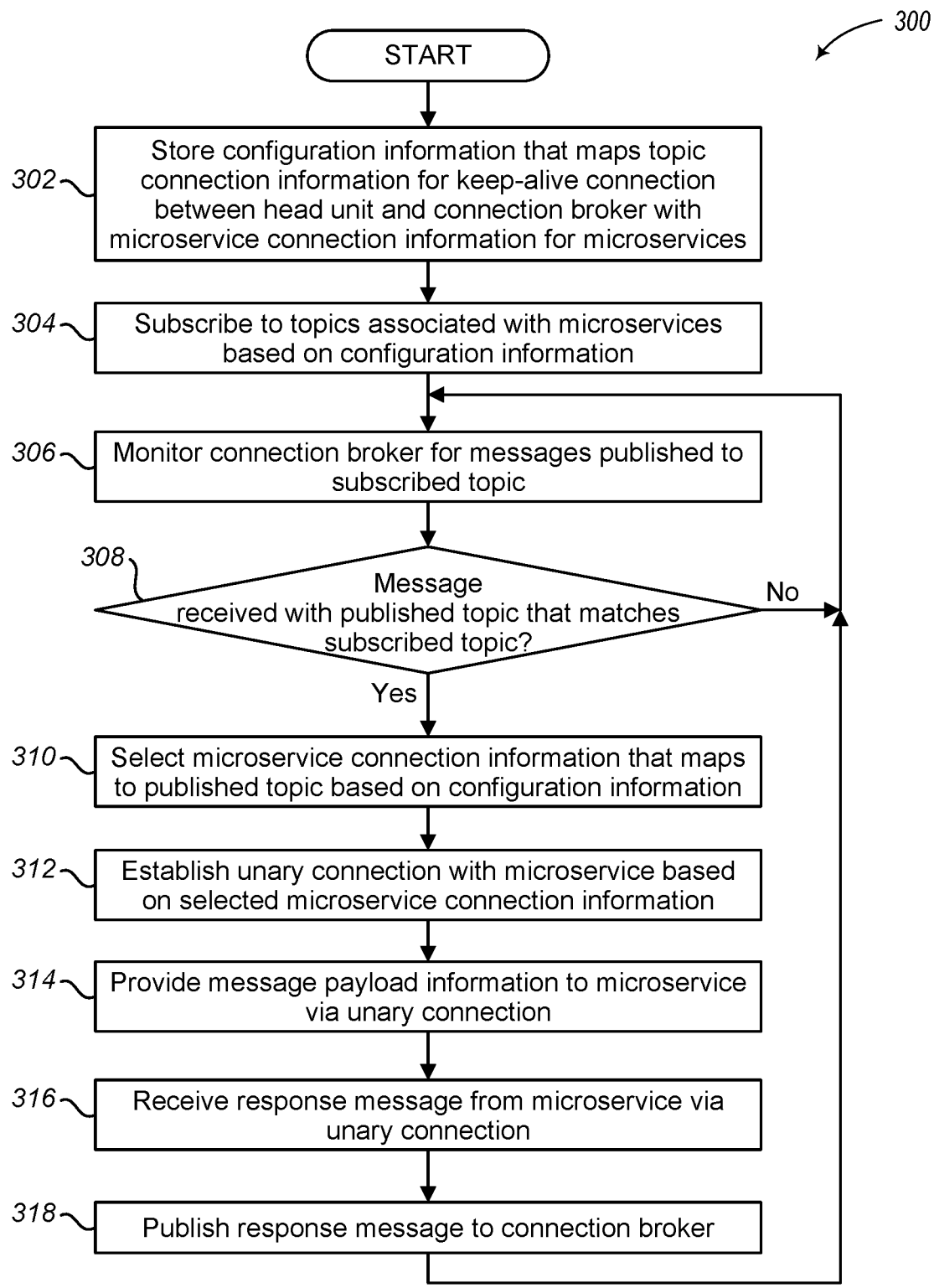
FIG. 3 illustrates a logical flow diagram generally showing one embodiment of an overview process for obtaining messages provided by a vehicle and establishing a connection to a microservice based on the obtained message in accordance with embodiments described herein.

FIG. 3 illustrates a logical flow diagram generally showing one embodiment of an overview process 300 for obtaining messages provided by a vehicle and establishing a connection to a microservice based on the obtained message in accordance with embodiments described herein.

Process 300 begins, after a start block, at block 302, where configuration information is stored. This configuration information maps topic connection information with microservice connection information. The topic connection information is for a keep-alive connection between a head unit and a topic connection broker. In various embodiments, the keep-alive connection is a single socket connection that is established and maintained for multiple messages transmitted from the head unit to the connection broker. The microservice connection information defines call information that enables establishment of a limited-duration connection with a microservice.

Process 300 proceeds to block 304, where the bridge service subscribes to one or more topics with the connection broker based on the configuration information. These subscribed topics are associated with one or more microservices as determined by the mapping in the configuration information.

Process 300 continues at block 306, where the bridge service monitors the connection broker for messages that are published to the subscribed topic. In some embodiments, when the connection broker receives a message that has a published topic that matches a subscribed topic of the bridge service, the connection broker routes or forwards that message, or the payload information from the message, to the bridge service.

Process 300 proceeds next to decision block 308, where a determination is made whether a message has been received with a published topic that matches a subscribed topic. In various embodiments, the connection broker compares the published topic of the messages from the head unit of a vehicle with the subscribed topics provided by the bridge service. If such a message has been received, process 300 flows to block 310; otherwise, process 300 loops to block 306 to continue to monitor the connection broker for messages.

At block 310, microservice connection information that maps to the published topic is selected based on the configuration information. Because the published topic of the message matches a subscribed topic provided by the bridge service, the published topic can be utilized to select the corresponding microservice connection information that maps to the same subscribed topic in the configuration information.

Process 300 continues next at block 312, where a unary connection is established with the microservice based on the selected microservice connection information. In some embodiments, the unary connection is a REST connection with the microservice. In other embodiments, the unary connection is a gRPC connection with the microservice. In yet other embodiments, other messaging protocols may also be utilized where a semantic translation is possible.

In various embodiments, this connection is a limited-duration connection with the microservice independent of the payload information from the message. In some embodiments, the message may include information that is used to establish the unary connection. For example, a username and password for the microservice may be included in the message.

Process 300, proceeds next to block 314, where payload information from the message is provided to the microservice via the unary connection. In some embodiments, the entire message is provided to the microservice. In other embodiments, only a portion of the message, such as the payload data without header information, is provided to the microservice.

Process 300 continues next at block 316, where a response message or response information is received from the microservice via the unary connection. In some embodiments, the response message is an acknowledgement indicating that the microservice received the message. In other embodiments, the response message is response information generated by the microservice from the processing of the message.

Process 300 proceeds to block 318, where the response message or response information is published to the connection broker. The head unit head may have previously subscribed to the same topic so that it can obtain the response message from the connection broker via the keep alive connection when the response message is published to the connection broker. In various embodiments, the stored configuration information indicates what publish topic is to be used when the response message is published to the connection broker.

After block 318, process 300 loops to block 306 to continue to monitor the connection broker for additional messages.

Figure 4:
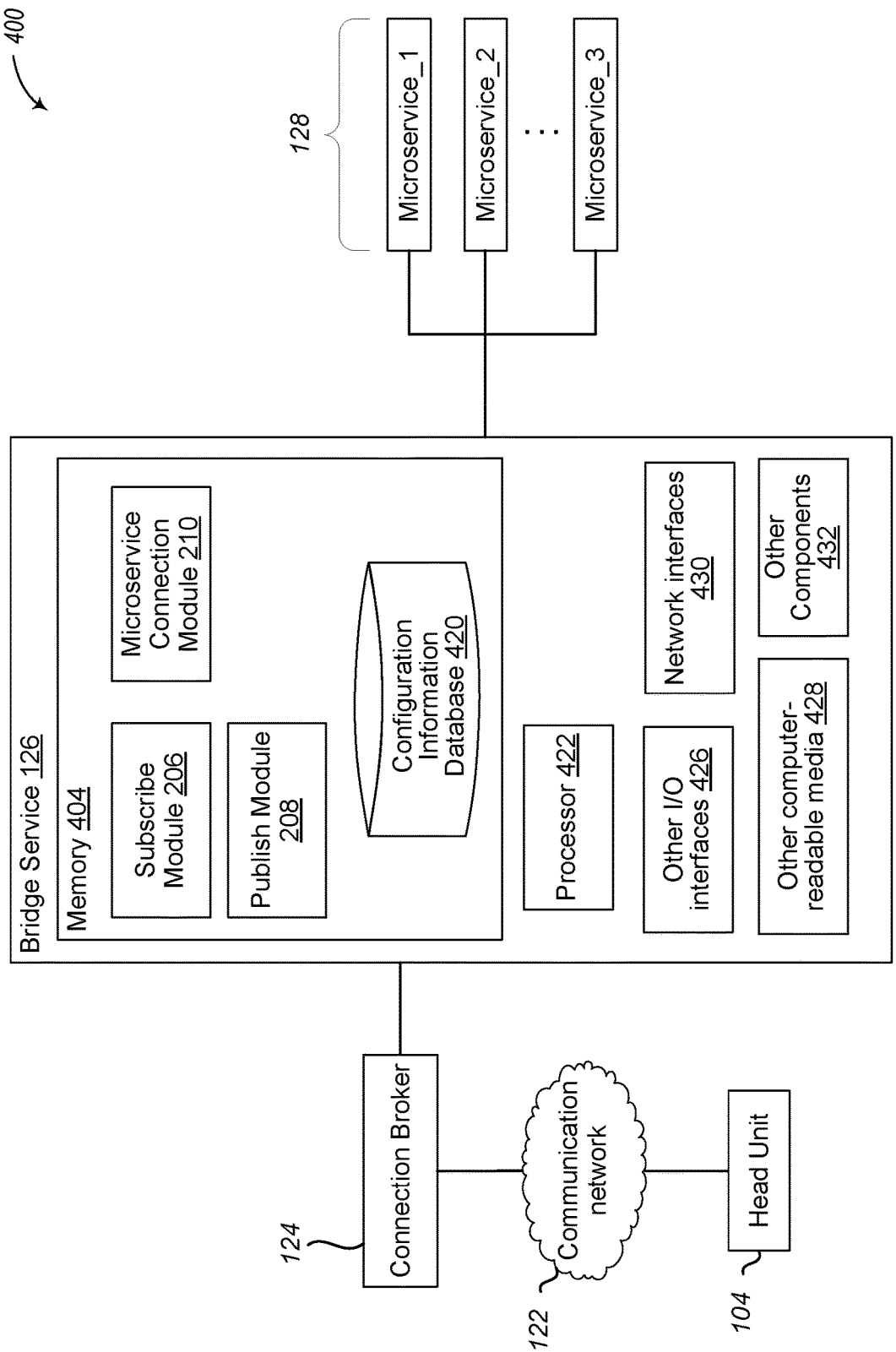
FIG. 4 shows a system diagram that describes one implementation of computing systems for implementing embodiments described herein.

FIG. 4 shows a system diagram that describes one implementation of computing systems for implementing embodiments described herein. System 400 includes bridge service 126, head unit 104, connection broker 124, and one or more microservices 128.

As described herein, bridge service 126 is a computing device that can perform functionality described herein for coordinating communications between a keep-alive connection associated with a head unit 104 of a vehicle and unary connections associated with microservices 128. One or more special-purpose computing systems may be used to implement the bridge service 126. Accordingly, various embodiments described herein may be implemented in software, hardware, firmware, or in some combination thereof. The bridge service 126 includes memory 404, one or more processors 422, input/output (I/O) interfaces 426, other computer-readable media 428, network interface 430, and other components 432.

Processor 422 includes one or more processing devices that execute computer instructions to perform actions, including at least some embodiments described herein. In various embodiments, the processor 422 may include one or more central processing units ("CPU"), programmable logic, or other processing circuitry.

Memory 404 may include one or more various types of non-volatile and/or volatile storage technologies. Examples of memory 404 include, but are not limited to, flash memory, hard disk drives, optical drives, solid-state drives, various types of random-access memory ("RAM"), various types of read-only memory ("ROM"), other computer-readable storage media (also referred to as processor-readable storage media), or other memory technologies, or any combination thereof. Memory 404 may be utilized to store information, including computer-readable instructions that are utilized by processor 422 to perform actions, including at least some embodiments described herein.

Memory 404 may have stored thereon various modules, such as subscribe module 206, publish module 208, and microservice connection module 210. The subscribe module 206 provides functionality for the bridge service 126 to communicate with the connection broker 124 to subscribe to one or more subscribed topics associated with the microservices 128 and to receive messages from the connection broker 124 having a published topic that matches one of the subscribed topics. The publish module 208 provides functionality to publish messages to the connection broker 124 for transmission to the head unit 104. And the microservice connection module 210 provides functionality to establish unary connections with the microservices 128 based on the subscribed topic of the received message.

Memory 404 may also store configuration information database 420, which includes configuration information that maps the keep-alive connection information (e.g., the subscribed topics) associated with the head unit 104 with microservice connection information (e.g., connection establishment instructions) associated with the microservices 128.

I/O interfaces 426 may include interfaces for various other input or output devices, such as audio interfaces, video interfaces, USB interfaces, physical buttons, keyboards, or the like.

Other computer-readable media 428 may include other types of stationary or removable computer-readable media, such as removable flash drives, external hard drives, or the like.

Network interfaces 430 are configured to communicate with other computing devices, such as the connection broker 124 and the microservices 128. Network interfaces 430 include transmitters and receivers (not illustrated) to send and receive data as described herein.

The connection broker 124, the head unit 104, and the microservices 128 include special-purpose computing systems that may be used to communicate with the bridge service 126 to provide embodiments described herein. Accordingly, various embodiments described herein may be implemented in software, hardware, firmware, or in some combination thereof.

The connection broker 124, the head unit 104, and the microservices 128 include computing components similar to those of the bridge service 126. For example, the connection broker 124, the head unit 104, and the microservices 128 may each include a memory, one or more processors, network interfaces, and I/O interfaces, which may be similar to or incorporate embodiments of memory 404, processor 422, network interface 430, and I/O interfaces 426 of bridge service 126, respectively.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:

1. A computer-implemented method, comprising:
   storing configuration information that maps topic connection information for a keep-alive connection between a head unit of a vehicle and a connection broker with microservice connection information for one or more microservices;
   subscribing with the connection broker to one or more topics associated with the one or more microservices via the keep-alive connection based on the configuration information;
   receiving, from the connection broker, a message published to the keep-alive connection having a published topic that corresponds to a subscribed topic of the one or more subscribed topics;
   selecting the microservice connection information that maps to the published topic for the message based on the configuration information;
   establishing a unary connection with a microservice of the one or more microservices based on the selected microservice connection information; and
   providing payload information from the message to the microservice via the unary connection.

2. The computer-implemented method of claim 1, wherein establishing the unary connection with the microservice based on the selected microservice connection information, includes:
   establishing a limited-duration connection with the microservice independent of the payload information from the message.

3. The computer-implemented method of claim 1, wherein establishing the unary connection with the microservice includes:
   establishing a REST connection with the microservice.

4. The computer-implemented method of claim 1, wherein establishing the unary connection with the microservice includes:
   establishing a gRPC connection with the microservice.

5. The computer-implemented method of claim 1, wherein storing the configuration information that maps the topic connection information with the microservice connection information for the one or more microservices, includes:
   storing, for a first microservice, a first topic in which to subscribe to first messages published by the head unit using the first topic; and
   storing, for the first microservice, a second topic in which to publish second messages in response to the first messages.

6. The computer-implemented method of claim 1, wherein storing the configuration information that maps the topic connection information with the microservice connection information for the one or more microservices, includes:
   storing, for a first microservice, call information that enables establishment of a limited-duration connection with the first microservice.

7. The computer-implemented method of claim 1, wherein the connection broker is an MQTT broker.

8. The computer-implemented method of claim 1, wherein the keep-alive connection is a single socket connection that is maintained for multiple messages transmitted by the head unit.

9. The computer-implemented method of claim 1, wherein the microservice is a backend server configured to maintain accessory information obtained from one or more accessories on the vehicle.

10. A system, comprising:
    a first non-transitory computer-readable storage medium having stored thereon first instructions that when executed by a first processor of a connection broker, cause the first processor to:
       establish a keep-alive connection between a head unit of a vehicle and the connection broker; and
       receive, from the head unit via the keep-alive connection, a message associated with first keep-alive connection information of a plurality of keep-alive connection information provided by a bridge service;
    a configuration information database configured to store a mapping between the plurality of keep-alive connection information and a plurality of microservice connection information for a plurality of microservices; and
    a second non-transitory computer-readable storage medium having stored thereon second instructions that when executed by a second processor of the bridge service, cause the second processor to:
receive, from the connection broker, the message associated with the first keep-alive connection information;
select the first microservice connection information from the plurality of microservice connection information that maps to the first keep-alive connection information based on the mapping stored in the configuration information database;
establish a unary connection with a microservice of the plurality of microservices based on the first microservice connection information; and
provide payload information from the message to the microservice via the unary connection.

11. The system of claim 10, further comprising:
a third non-transitory computer-readable storage medium having stored thereon third instructions that when executed by a third processor of the vehicle, cause the third processor to:
obtain, from one or more accessories of the vehicle, accessory information associated with the first keep-alive connection information;
generate the message to include the accessory information in the payload information; and
transmit the message to the connection broker via the keep-alive connection based on the first keep-alive connection information.

12. The system of claim 10, wherein the execution of the second instructions by the second processor to establish the unary connection with the microservice based on the first microservice connection information further cause the second processor to:
establish a limited-duration connection with the microservice independent of the payload information from the message.

13. The system of claim 10, wherein the configuration information database is further configured to:
store, for a first microservice, a first topic in which to subscribe to first messages published by the head unit using the first topic; and
store, for the first microservice, a second topic in which to publish second messages in response to the first messages.

14. The system of claim 10, wherein the configuration information database is further configured to:
store, for the first microservice, call information that enables establishment of a limited-duration connection with the first microservice.

15. A computer-implemented method, comprising:
storing configuration information that maps a plurality of keep-alive connection information for a keep-alive connection between a head unit of a vehicle and a connection broker with a plurality of microservice connection information for a plurality of microservices;
receiving, from the connection broker, a message that is transmitted from the head unit to the connection broker via the keep-alive connection and that is associated with first keep-alive connection information from the plurality of keep-alive connection information;
selecting first microservice connection information that maps to the first keep-alive connection information based on the configuration information;
establishing a unary connection with a microservice of the plurality of microservices based on the first microservice connection information; and
providing at least a portion of the message to the microservice via the unary connection.

16. A system, comprising:
a configuration information database configured to store configuration information that maps topic connection information for a keep-alive connection between a head unit and a topic connection broker with microservice connection information for one or more microservices;
a subscribe module configured to subscribe to one or more topics associated with the one or more microservices via the keep-alive connection based on the configuration information;
a message receipt module configured to receive, from the topic connection broker, a message published to the keep-alive connection having a published topic that maps to at least one of the one or more subscribed topics;
a microservice connection module configured to:
select the microservice connection information that maps to the published topic for the message based on the configuration information;
establish a unary connection with a microservice based on the selected microservice connection information and a payload of the message; and
provide message payload information to the microservice via the unary connection.

* * * * *